United States Patent [19]
Horigome et al.

[11] Patent Number: 5,828,986
[45] Date of Patent: Oct. 27, 1998

[54] VIDEO CAMERA FOR PHOTOGRAPHING ANIMATED IMAGES

[75] Inventors: Koichi Horigome, Tokyo; Toshimitsu Harada, Hachioji; Takashi Terauchi, Hachioji; Masaki Shimada, Hachioji; Masashi Saito, Hachioji, all of Japan

[73] Assignee: Konica Corporation, Tokyo, Japan

[21] Appl. No.: 622,910

[22] Filed: Mar. 29, 1996

[30] Foreign Application Priority Data

Apr. 3, 1995 [JP] Japan ................................. 7-101708

[51] Int. Cl.⁶ .............................. H04N 5/30; H04N 5/225
[52] U.S. Cl. ...................... 702/126; 358/906; 348/231; 348/552; 368/120
[58] Field of Search ....................... 364/514 R; 348/231, 348/232, 233, 239, 207, 372, 375, 341, 373, 552; 211/203; 248/177.1; D16/244; 358/906; 386/107, 119, 120; 702/126

[56] References Cited

U.S. PATENT DOCUMENTS

| | | | |
|---|---|---|---|
| 4,470,077 | 9/1984 | Komine | 348/335 |
| 4,800,448 | 1/1989 | Kaneko et al. | 348/223 |
| 4,802,020 | 1/1989 | Miyake et al. | 348/333 |
| 4,811,118 | 3/1989 | Katoh et al. | 358/906 |
| 4,918,622 | 4/1990 | Granger et al. | |
| 4,937,676 | 6/1990 | Finelli et al. | 358/906 |
| 4,985,783 | 1/1991 | Falck | 358/906 |
| 5,034,804 | 7/1991 | Sasaki et al. | 348/232 |
| 5,132,800 | 7/1992 | Wada et al. | 348/375 |
| 5,231,501 | 7/1993 | Sakai | 348/231 |
| 5,260,795 | 11/1993 | Sakai et al. | 348/231 |
| 5,311,246 | 5/1994 | Warner et al. | |
| 5,341,171 | 8/1994 | Mon et al. | 348/373 |
| 5,404,316 | 4/1995 | Klinger et al. | 364/514 |
| 5,438,359 | 8/1995 | Aoki | 348/207 |

FOREIGN PATENT DOCUMENTS 0 588 649 A1  3/1994  European Pat. Off.

*Primary Examiner*—John E. Barlow, Jr.
*Assistant Examiner*—Bryan Bui
*Attorney, Agent, or Firm*—Finnegan, Henderson, Farabow, Garrett & Dunner, L.L.P.

[57] ABSTRACT

A video camera, capable of being connected with a computer, for photographing animated images. The video camera includes: a camera main body for outputting image signals corresponding to the animated images; and a memory adapter, detachable from the video camera, for recording one of the animated images as a still picture. The memory adapter also sends back the image signals, corresponding to the still picture, to the video camera so that the video camera outputs the image signals corresponding to the still picture.

8 Claims, 19 Drawing Sheets

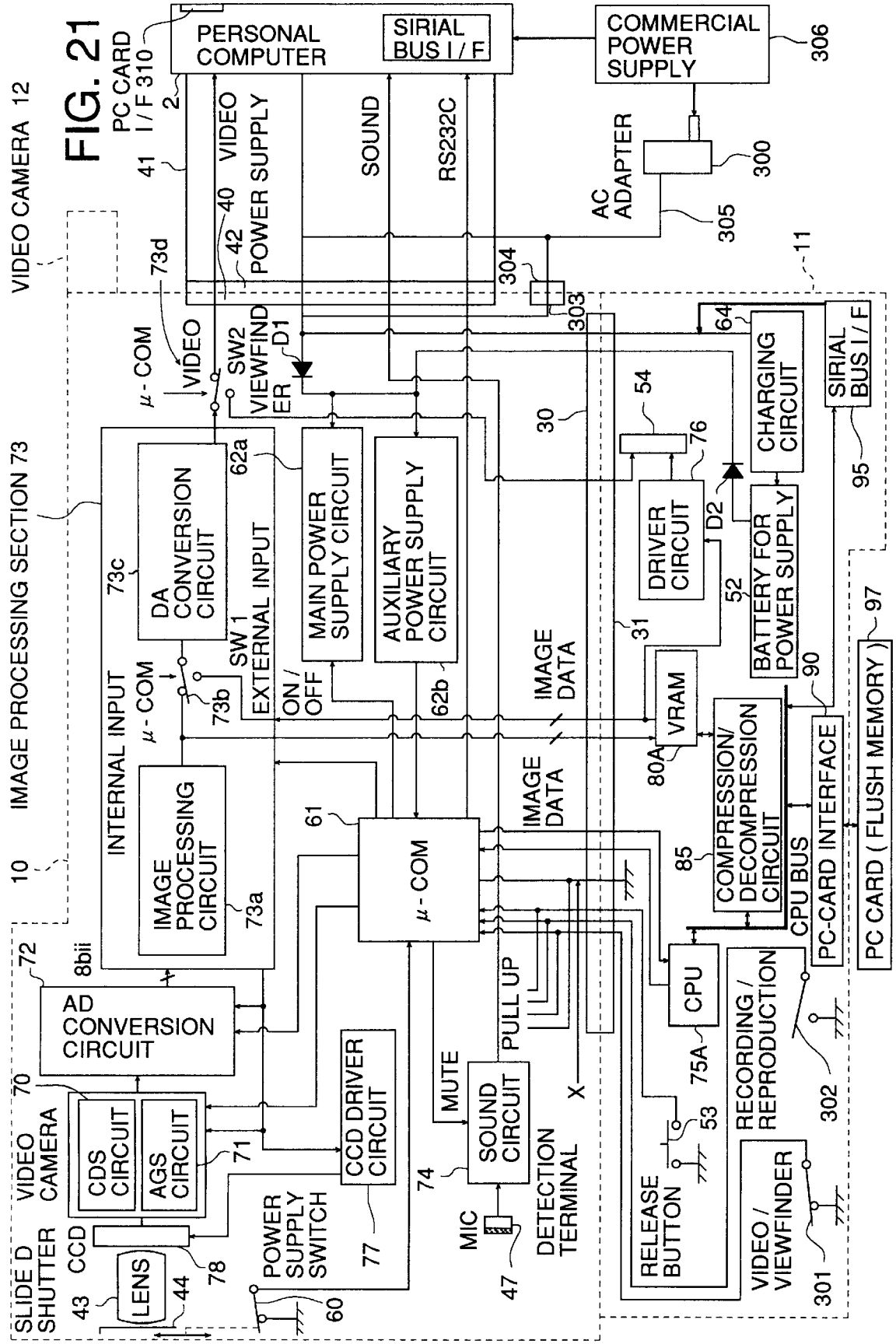

VIDEO CAMERA FOR PHOTOGRAPHING ANIMATED IMAGES

BACKGROUND OF THE INVENTION

The present invention relates to a video camera wherein images are taken in a computer.

A practical application of a computer network includes, for example, a TV conference system. In the TV conference system of this kind, there are used, for example, personal computers in some of which one's face and partners' faces are displayed together with conference information on an image display equipment at a remote place so that a conversation may be held.

A video camera used for picking up images of a person who converses is provided on an image display equipment to be connected thereto through a cable, and a face of the person who converses and its surrounding items can be photographed by the video camera to be transmitted when the person takes a chair where he operates a personal computer.

The video camera is connected to the image display equipment through a cable as stated above, and therefore, it is not a problem, in particular, to photograph a face of the conversing person and nearby document. However, items located out of a range covered by the cable in addition to the face of the conversing person and nearby document are sometimes required to be photographed to be transmitted.

In such cases, a conventional video camera which is connected to an image display equipment through a cable is unable to photograph easily the items located out of the range within a cable's length, which is inconvenient.

Therefore, it is considered, for example, that the video camera can be carried to the place which is away from the image display equipment, and in this case, there is required the function which can pick up images into a personal computer even when the video camera is not connected through a cable.

SUMMARY OF THE INVENTION

The present invention has been achieved taking the aforementioned points into consideration, and its object is to provide a video camera which is easy to be operated and is capable of picking up images into a computer. Its object, in particular, is to provide a video camera capable of picking up a part of photographed images into a computer as a static image. Further, the object is to provide a video camera wherein it is possible to freeze images and mute sounds temporarily when a conversing person wants to be neither seen nor heard. Still further, the object is to provide a video camera which is easy to be operated and is capable of picking up images at any places. Further, the object is to provide a video camera capable of picking up even sounds. The object is further to provide a video camera wherein a camera main body can easily be mounted on or dismounted from a camera stand. The object of the invention is still further to provide a portable video camera capable of picking up sharp and clear images.

For solving the aforesaid problems and for achieving the object mentioned above, a video camera of the invention is characterized in that a camera main body that photographs animated images and outputs video signals is provided with a memory adapter that records the animated images as a still picture, then, the still picture is sent to the camera main body, thus, the still picture is video-outputted in the camera main body.

A video camera of the invention is characterized in that the video camera is provided with a camera main body that photographs animated images, digital-converts the signals thereof for digital-signal-processing them, and then analog-converts them to output video signals, a memory for recording the digital signals, a controller for controlling the memory, a release button, a battery for power supply, a battery charger, a viewfinder, and a memory adapter equipped with mode-changing switches respectively for video/viewfinder and recording/reproduction, wherein, under the power supply switch is ON, when a viewfinder mode is selected, output of video signals from the aforesaid camera main body is stopped so that viewfinder images are outputted, and when a release button is pressed in the case of a recording mode, the image at that moment are recorded in the memory as a still picture, and when a reproduction mode is selected, the still picture recorded is reproduced.

A video camera of the invention is characterized in that when a release button is pressed under the condition that the aforesaid memory adapter is on the video mode and on the recording mode, images are taken in the memory, and a mode to reproduce immediately the images taken in is selected, then a freeze mode wherein a still picture is outputted for video output is selected, and sound signals are made to be on the state of mute, and when a lens barrier is closed before releasing the aforesaid release button under the state mentioned above, the state of freeze is maintained for video signal output and the mute mode of sound is kept even when the release button is released from pressing.

A video camera of the invention is characterized in that, in the aforesaid memory adapter, when a power cord is connected to a camera main body or a camera stand, a battery for power supply is constantly charged by a battery charger, while when the power cord is not connected, the battery for power supply supplies power source to the camera main body and the memory adapter.

A video camera of the invention is characterized in that, a camera main body that photographs animated images and sends them to a video capture board of a computer as video signals can be mounted on or dismounted from a camera stand through an electrical connector, a cord on the side of the computer can be connected to or disconnected from the aforesaid camera stand through an electrical connector, and further the cord on the side of the computer can be connected to or disconnected from the aforesaid camera main body through an electrical connector under the state that the aforesaid camera main body is removed from the camera stand.

A video camera of the invention is characterized in that a microphone is provided on the camera main body so that sound signals can be sent to a sound capture board of a computer.

A video camera of the invention is characterized in that the aforesaid camera main body can be mounted on or dismounted from a camera stand through an electrical connector.

A video camera of the invention is characterized in that the aforesaid memory adapter can be mounted on or dismounted from the aforesaid camera main body through an electrical connector.

A video camera of the invention is characterized in that the aforesaid memory adapter is provided with a viewfinder and/or a focus indicator.

In the video camera of the invention, it is possible, by sending a still picture recorded by the memory adapter to the camera main body, to video-output the still picture and to record what is located at a distant place simply for taking it in.

In the video camera of the invention having constitution wherein video signals are temporarily frozen and sound signals are muted by means of a release switch, it is possible to freeze images and mute sounds temporarily through operation of the release switch when a conversing person wants to be neither seen nor heard.

Further, in the video camera of the invention, a battery for power supply is provided on the memory adapter, and when the power cord is taken away, the battery for power supply is used as power source for driving the memory adapter and the camera main body, thus, the video camera can be used as a portable one.

Still further, in the video camera of the invention, a cord on the side of the computer is connected to the camera stand under the condition that the camera main body is mounted on the camera stand, and thereby, even when the video camera is used with a cable connected thereto, the cable does not get in the way in the case of position change when the camera main body photographs. It is further possible to connect a cord on the side of the computer to the camera main body through an electrical connector on a changeover basis under the condition that the camera main body is dismounted from the camera stand, thereby the video camera can easily be handled and is capable of photographing at any position.

In the video camera of the invention, both video signals and sound signals can be transmitted, and a range of application can be broadened accordingly.

In the video camera of the invention, the camera main body can be mounted on or dismounted from the camera stand simply through an electrical connector, and thereby, for example, it is possible to dismount the camera main body from the camera stand easily and to connect a memory adapter to the camera main body for using.

In the video camera of the invention, a memory adapter can simply be mounted on or dismounted from the camera main body through an electrical connector, thus, when using the memory adapter, it can be mounted on the camera main body easily, and when it is not used, it can be dismounted simply.

In the video camera of the invention, the memory adapter is provided with a viewfinder and/or a focus indicator, and thereby it is possible to confirm images before photographing them and to photograph them sharply to take them in a computer.

BRIEF DESCRIPTION OF THE DRAWINGS

FIG. 21 is a block diagram showing the schematic constitution in another example of the video camera.

DETAILED DESCRIPTION OF THE PREFERRED EMBODIMENT

EXAMPLES

Figure 1:
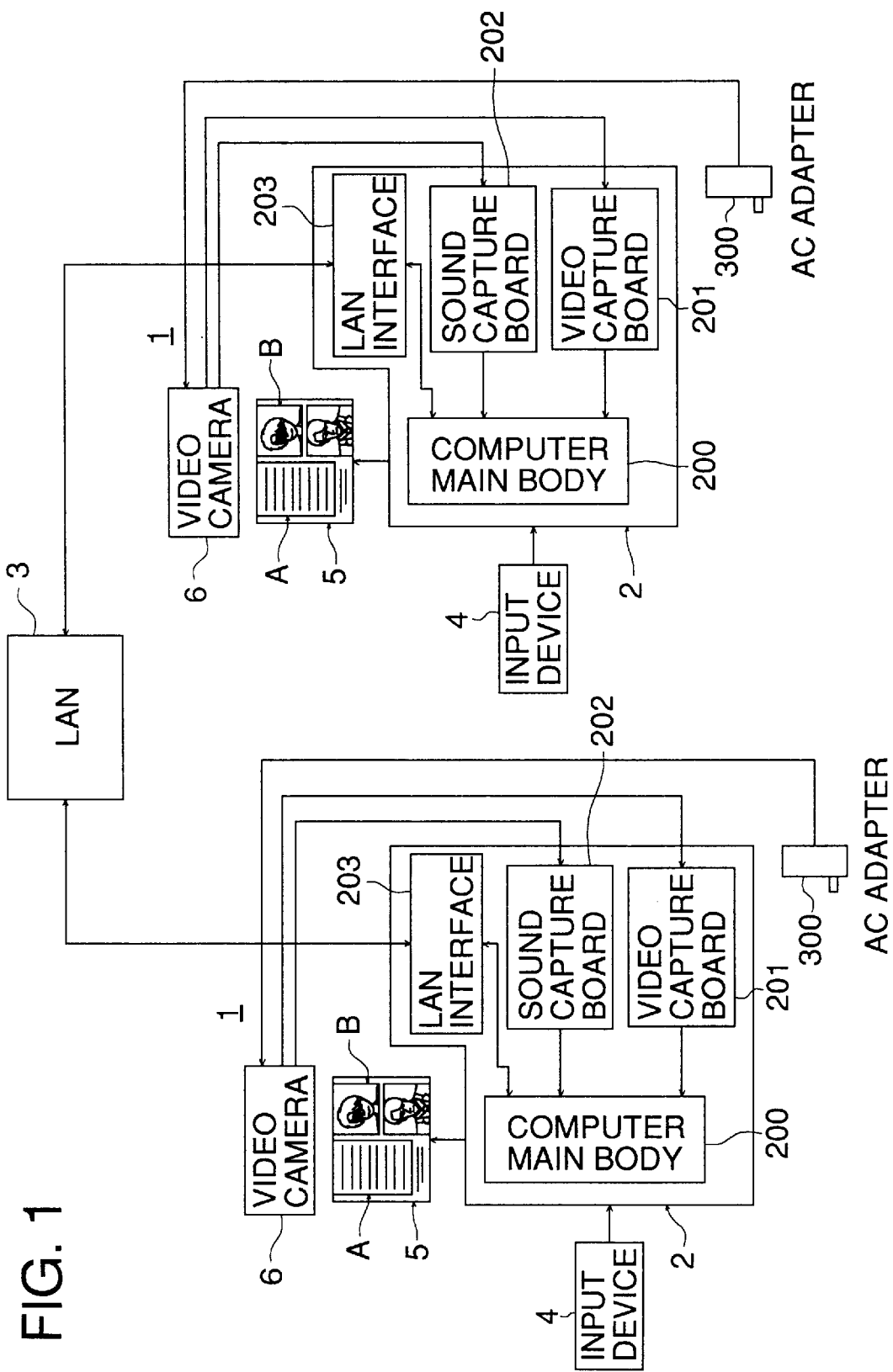
FIG. 1 is a schematic diagram illustrating a TV conference system employing a computer network.

Examples of the video camera in the invention will be explained as follows. FIG. 1 represents a TV conference system employing a computer network. In this TV conference system 1, personal computers 2, for example, are used, and each personal computer 2 is composed of computer main body 200, video capture board 201 for taking video signals in, sound capture board 202 for taking sound signals in, and LAN interface 203, and is connected to LAN 3 through the LAN interface 203.

To the personal computer 2, there are connected input device 4, image display device 5 and video camera 6. To the video camera 6, there is given power source through AC adapter 300 connected to commercial power supply. Incidentally, the video camera 6 may also be given power source from the personal computer 2 which is given power source from the commercial power supply.

The personal computer 2 takes in video signals outputted from video camera 6 by means of video capture board 201, and takes in sound signals outputted from video camera 6 by means of sound capture board 202. For conversation in the TV conference system 1, there are displayed, through computer communication of LAN 3 at a remote place, information A and photographed image B which is produced by video camera 6 such as one's own face and a partner's face, on image display device 5.

The video camera 6 takes in, for example, images such as document or the like in addition to a partner's face, and sends video signals of them to personal computers 2 so that each personal computer 2 may display on the image display device 5.

Figure 2:
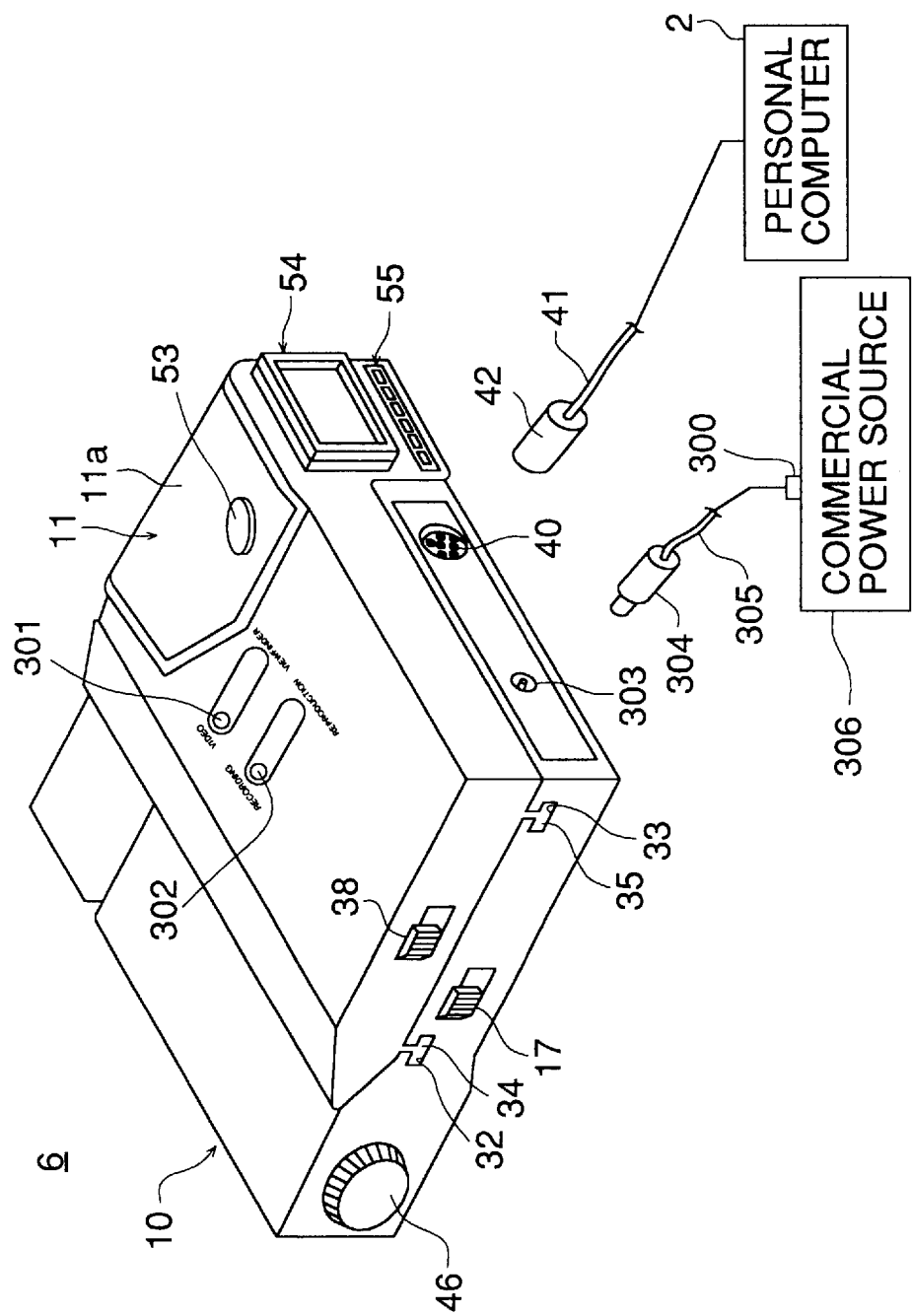
FIG. 2 is a perspective view of an example wherein power source is supplied from an AC adapter of a video camera.
Figure 3:
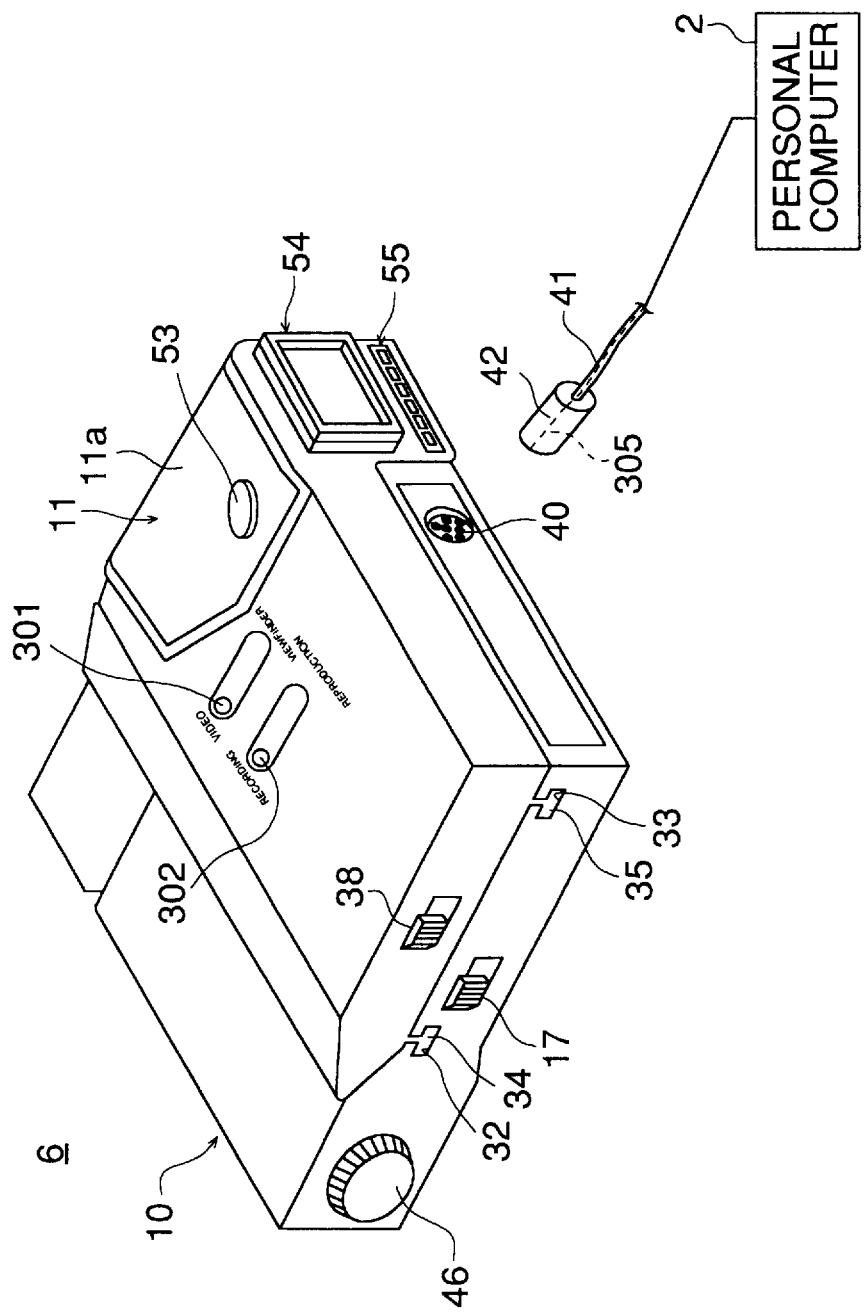
FIG. 3 is a perspective view of an example wherein power source is supplied from the side of a personal computer of a video camera.
Figure 4:
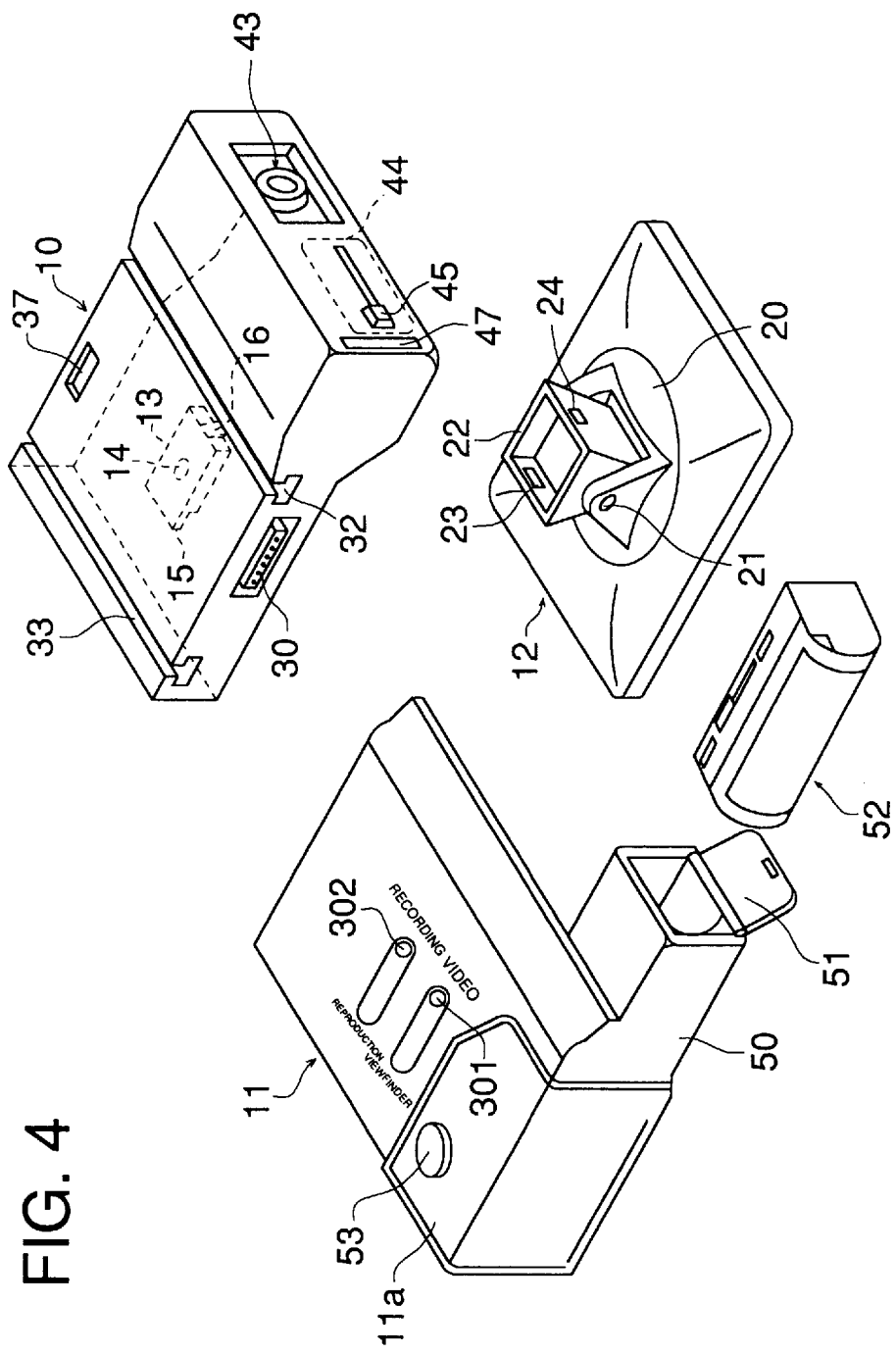
FIG. 4 is an exploded perspective view of a video camera.
Figure 5:
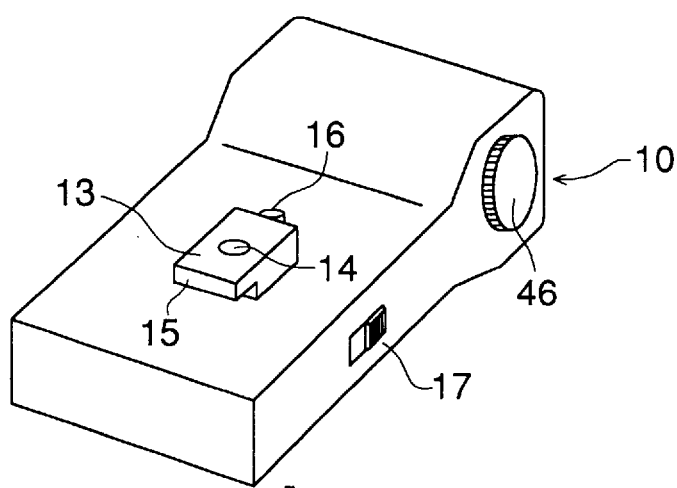
FIGS. 5(a) and 5(b) represent a perspective view showing how a camera main body is mounted on a camera stand.
Figure 5:
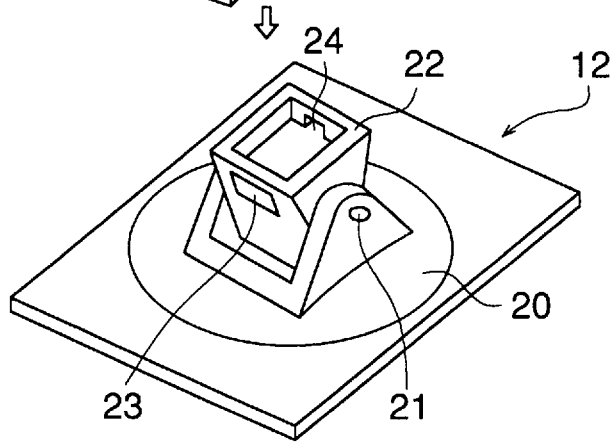
Figure 5:
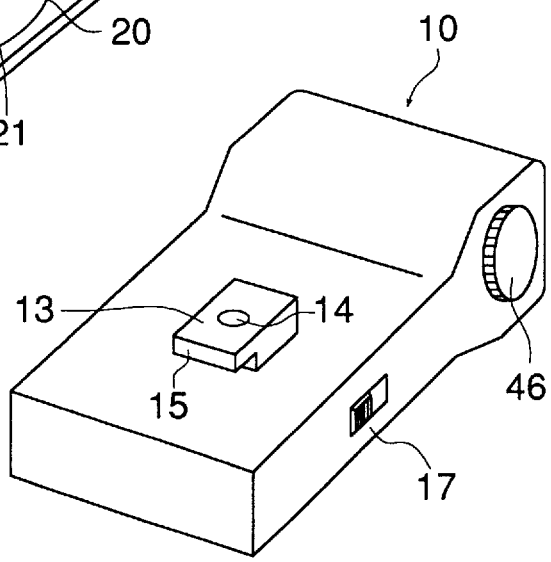
Figure 6:
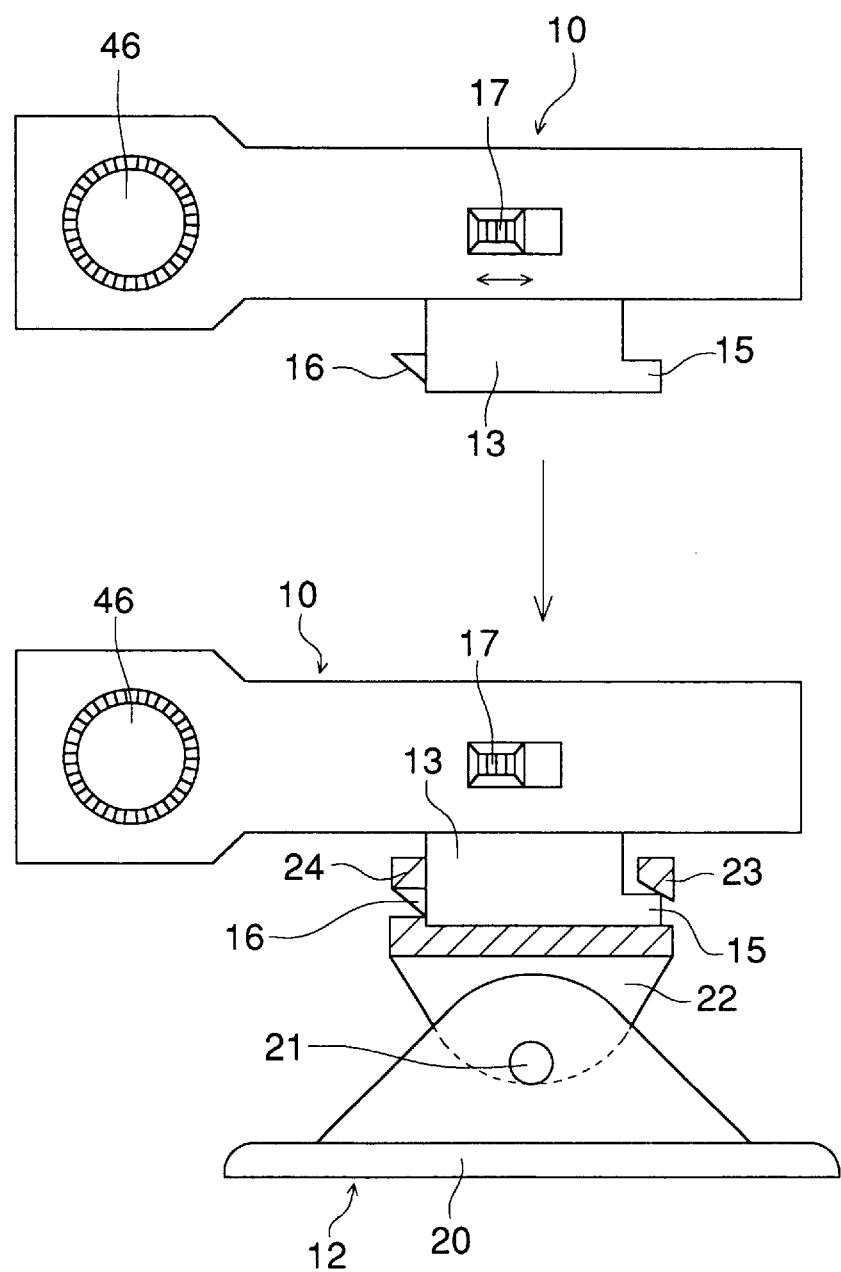
FIG. 6 is a sectional view showing how a camera main body is mounted on a camera stand.
Figure 7:
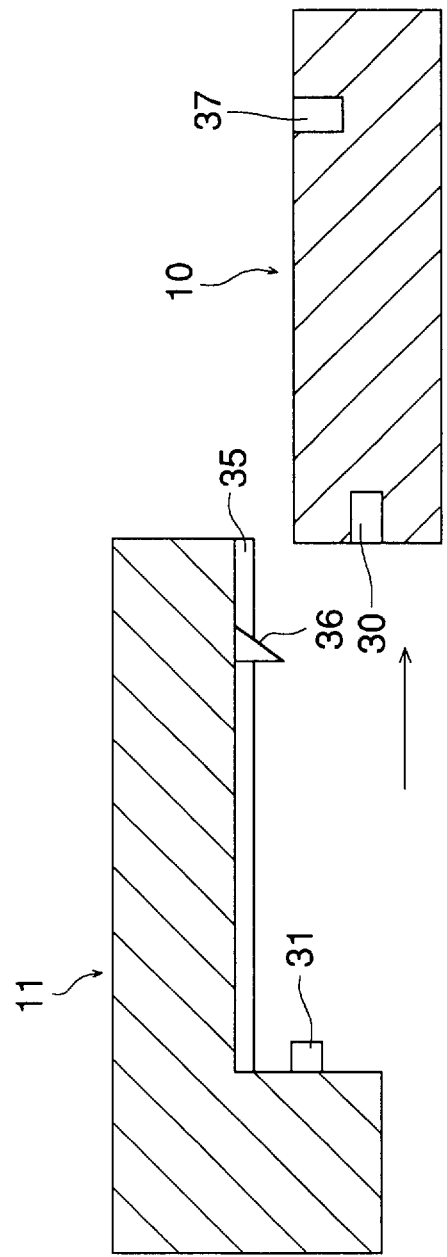
FIGS. 7(a) and 7(b) represent a diagram showing how a memory adapter is mounted on and dismounted from a camera main body.
Figure 7:
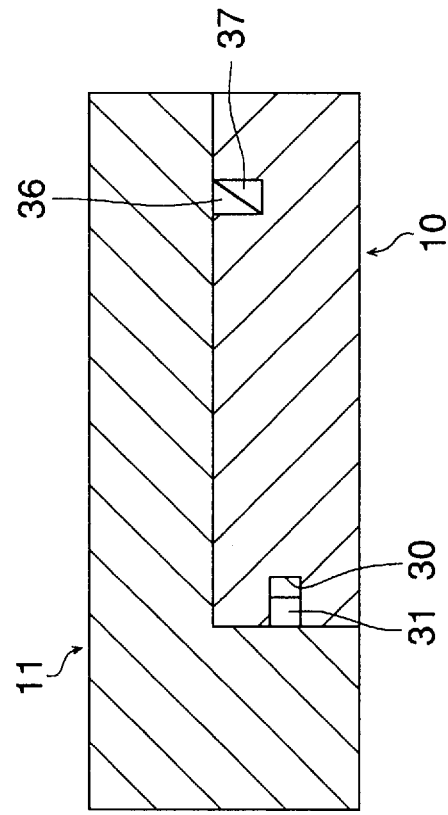
Figure 8:
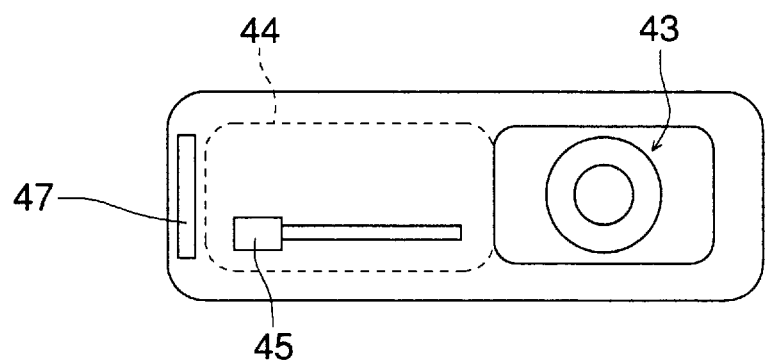
FIGS. 8(a) and 8(b) represent a diagram showing how a lens barrier is opened and closed.
Figure 8:
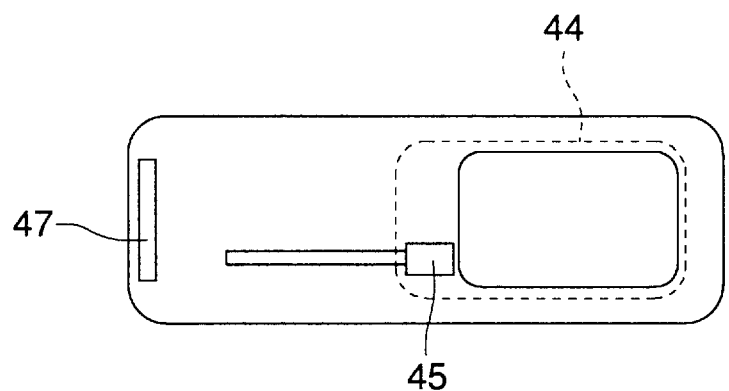

Next, video camera 6 used in TV conference system 1 will be explained as follow. FIG. 2 is a perspective view of an example wherein power source is supplied to the video camera through its AC adapter. FIG. 3 is a perspective view of an example wherein power source is supplied to the video camera from the side of a personal computer of the video camera, FIG. 4 is an exploded perspective view of the video camera, and FIG. 5 is a perspective view showing how a camera main body is mounted on a camera stand. FIG. 6 is a sectional view showing how a camera main body is mounted on a camera stand, FIG. 7 is a diagram showing mounting and dismounting between a camera main body and a memory adapter, and FIG. 8 is a diagram showing how a lens barrier is opened and closed.

In the video camera, camera main body 10 that photographs animated images and outputs their video signals is equipped with memory adapter 11 that records the images as a still picture, and the still picture recorded by the memory adapter 11 is sent to the camera main body 10 wherein the still picture is video-outputted.

Animated images described here are defined, equally to video images, to be aggregation of a series of still pictures in terms of time, and paired adjoining pictures among them correlate to each other.

Namely, the camera main body 10 photographs the animated images and digital-converts their signals for processing digital signals, and then analog-converts them to output video signals.

The memory adapter 11, on the other hand, is provided with a memory that records unillustrated digital signals, a controller that controls that memory, release button 53, battery 52 for power supply, unillustrated battery charger, viewfinder 54, mode-changeover switch 301 for video/viewfinder, and changeover switch 302 for recording/reproduction mode.

On the rear side of the camera main body 10, there is provided connector 40 which is connected to connector 42 for cable 41 that is a signal line for outputting to personal computer 2. Further, on the rear side of the camera main body 10, there is provided electric connector 303 which is connected to electric connector 304 to be connected, for example, to commercial power supply 306 through power cord 305.

In a video camera of the example in FIG. 3, power cord 305 is put in cable 41 which is a signal line outputting from camera main body 10 to personal computer 2 so that power source is supplied to the camera main body 10 from the side of personal computer 2.

When an unillustrated power switch is turned ON, the video camera 6 outputs video output through operation of mode-changeover switch 301 as an ordinary video camera in the case of a video mode, while in the case of a viewfinder mode, it stops video output from camera main body 10 and outputs viewfinder images. When release button 53 is pressed in the case of a recording mode selected through operation of mode-changeover switch 302, images at the moment when the release button is pressed are recorded in a memory as a still picture, and the recorded still picture is reproduced in the case of the reproduction mode.

When the release button 53 is pressed when memory adapter 11 is caused to be on the video mode through operation of mode-changeover switch 301 and is caused to be on the recording mode through operation of mode-changeover switch 302, images are taken in a memory, and a mode is changed to that wherein the images taken in are reproduced immediately, and the state is changed to that of freeze wherein a still picture is outputted in video output and sound signals are caused to be on the state of mute.

In the memory adapter 11, when power cord 305 is connected to camera main body 10 or to camera stand 12, battery 52 for power supply is constantly charged by an unillustrated battery charger, and when the power cord 305 is not connected, the battery 52 for power supply supplies electric power to the camera main body 10 and the memory adapter 11.

The camera main body 10 is capable of being mounted on and dismounted from camera stand 12, and when it is used in combination with memory adapter 11, it can be carried to the place that is away from personal computer 2 by removing cable 41 or power cord 305 in the case of FIG. 2 or by removing cable 41 in the case of FIG. 3.

The video camera 6 sends a still picture recorded by memory adapter 11 to the camera main body 10 where the transmission to personal computer 2 is possible. As stated above, a still picture stored by memory adapter 11 is sent to camera main body 10 where it is sent to personal computer 2, thereby those located at arbitrary locations can be photographed simply and taken in personal computer 2.

At the central portion on the rear side of camera main body 10, there is provided mounting section 13 on which screw hole 14 for tripod is formed so that camera main body 10 may be fixed on a tripod for photographing. On one side of the mounting section 13 for camera main body 10, there is formed projection 15, and on the other side thereof, there is formed engaging claw 16 which can be protruded out of or retreated in the mounting section 13 when main body mounting/dismounting lever 17 is operated. The main body mounting/dismounting lever 17 is urged by an unillustrated spring or the like so that it may return to its initial position. When the main body mounting/dismounting lever 17 is in its initial position shown in FIG. 5 (a), the engaging claw 16 is protruded and when the main body mounting/dismounting lever 17 is in its operation position shown in FIG. 5 (b), the engaging claw 16 is retreated.

At the central portion of camera stand 12, there is provided seating 20 so that it can rotate in the horizontal plane. On the seating 20, there is provided rotatably supporting member 22 through horizontal tilting shaft 21. The supporting member 22 on camera stand engages with mounting section 13 on camera main body 10. On one side of the supporting member 22, there is formed engagement hole 23 which engages with projection 15, and on the other side thereof, there is formed engagement hole 24 which engages with engaging claw 16.

The camera main body 10 is mounted on the camera stand 12 as shown in FIG. 6. Namely, the main body mounting/dismounting lever 17 on the main body 10 is operated to retreat the engaging claw 16 so that projection 15 on the mounting section 13 may engage with engaging hole 23 on the supporting member 22 on the camera stand 12. Then, when the main body mounting/dismounting lever 17 is released, it returns to its initial position, and the engaging claw 16 is protruded to engage with engaging hole 24, thus, the camera main body 10 is mounted on the camera stand 12. When locating the main body mounting/dismounting lever 17 at the operation position shown in FIG. 5 (b) for removing the camera main body 10 from the camera stand 12, the engaging claw 16 retreats and its engagement with engagement hole 24 is canceled. Then, when the camera main body 10 is lifted as it is, the projection 15 on the mounting section 13 is disengaged from the engagement hole 23.

On the outer side of the camera main body 10, there is provided connector 30, and at the corresponding position on the inner side of memory adapter 11, there is provided connector 31. Both camera main body 10 and memory adapter 11 are provided to be capable of being mounted and dismounted through this electrical connector. On the top of the camera main body 10, there are formed engagement grooves 32 and 33 respectively at the front position and the rear position, while on the bottom portion of the memory adapter 11, there are formed engagement rails 34 and 35 which respectively engage with engagement grooves 32 and 33 on the camera main body 10. Further, on the bottom surface of the memory adapter 11, there is provided engagement claw 36 which can engage with engagement hole 37 formed on the top of the camera main body 10. The engagement claw 36 can be protruded out of and retreated in the bottom surface of the memory adapter 11 when adapter mounting/dismounting lever 38 is operated.

The memory adapter 11 is attached to the camera main body 10 as shown in FIG. 7. Namely, the adapter mounting/dismounting lever 38 on memory adapter 11 is operated to retreat engagement claw 36 so that engagement rails 34 and 35 are engaged respectively with engagement grooves 32 and 33 of the camera main body 10, and then the memory adapter 11 is pushed in the arrowed direction as shown in FIG. 6(a). Thus, engagement claw 36 on the memory adapter 11 is engaged with engagement hole 37 on the camera main body 10 so that the memory adapter 11 is mounted. In this case, connector 30 on the camera main body 10 is engaged with connector 31 on the memory adapter 11.

For removing the memory adapter 11 from the camera main body 10, the adapter mounting/dismounting lever 38 is operated to retreat engagement claw 36, and the memory adapter 11 is moved in the direction opposite to that for mounting. Thus, the memory adapter is removed easily from the camera main body 10, and simultaneously with this, connector 30 on the camera main body 10 is disengaged from connector 31 on the memory adapter 11.

As stated above, the memory adapter 11 can be mounted on and dismounted from the camera main body 10 easily through the electrical connector, and when the memory adapter 11 is used, it can be connected to the camera main body 10 easily while when it is not used, it can easily be dismounted.

On the front side of the camera main body 10, there is arranged camera lens 43. There is provided lens barrier 44 which covers the camera lens 43, and this lens barrier 44 is opened and closed by lens barrier actuating lever 45. It is structured so that power supply is turned ON automatically when a user opens the lens barrier 44 for the purpose of using camera main body 10, and power supply is turned OFF automatically when the lens barrier is closed for suspension of the use. Therefore, operation is simple.

On the side located at front portion of the camera main body 10, there is provided focus adjusting means 46 which conducts focusing for photographing, and through operation of the focus adjusting means 46, it is possible to photograph even small images such as a document or the like or those located at arbitrary positions easily and clearly and to take them in personal computer 2.

On the front side of the camera main body 10, there is provided microphone 47 so that sound signals can be transmitted to personal computer 2. Therefore, a range of application can be extended because sound signals can be transmitted to personal computer 2.

On the memory adapter 11, there is provided battery holder 50 whose cover 51 is opened for loading therein battery for power supply 52. Thus, the memory adapter 11 is provided with battery for power supply 52, and when photographing with the memory adapter 11, the battery for power supply 52 serves as a driving power source for the memory adapter 11 and the camera main body 10, which makes it possible to use video camera 6 on a portable use basis.

On the memory adapter 11, there is formed handle portion 11a, and at the position of the handle portion 11a, there is provided release button 53. On the rear side of the memory adapter 11, there are provided viewfinder 54 and focus indicator 55. The viewfinder 54 makes it possible to photograph after confirming images by displaying a subject to be photographed. Further, the focus indicator 55 makes it possible to confirm a focus of a subject to be photographed easily and to photograph clearly for taking it in personal computer 2.

Figure 9:
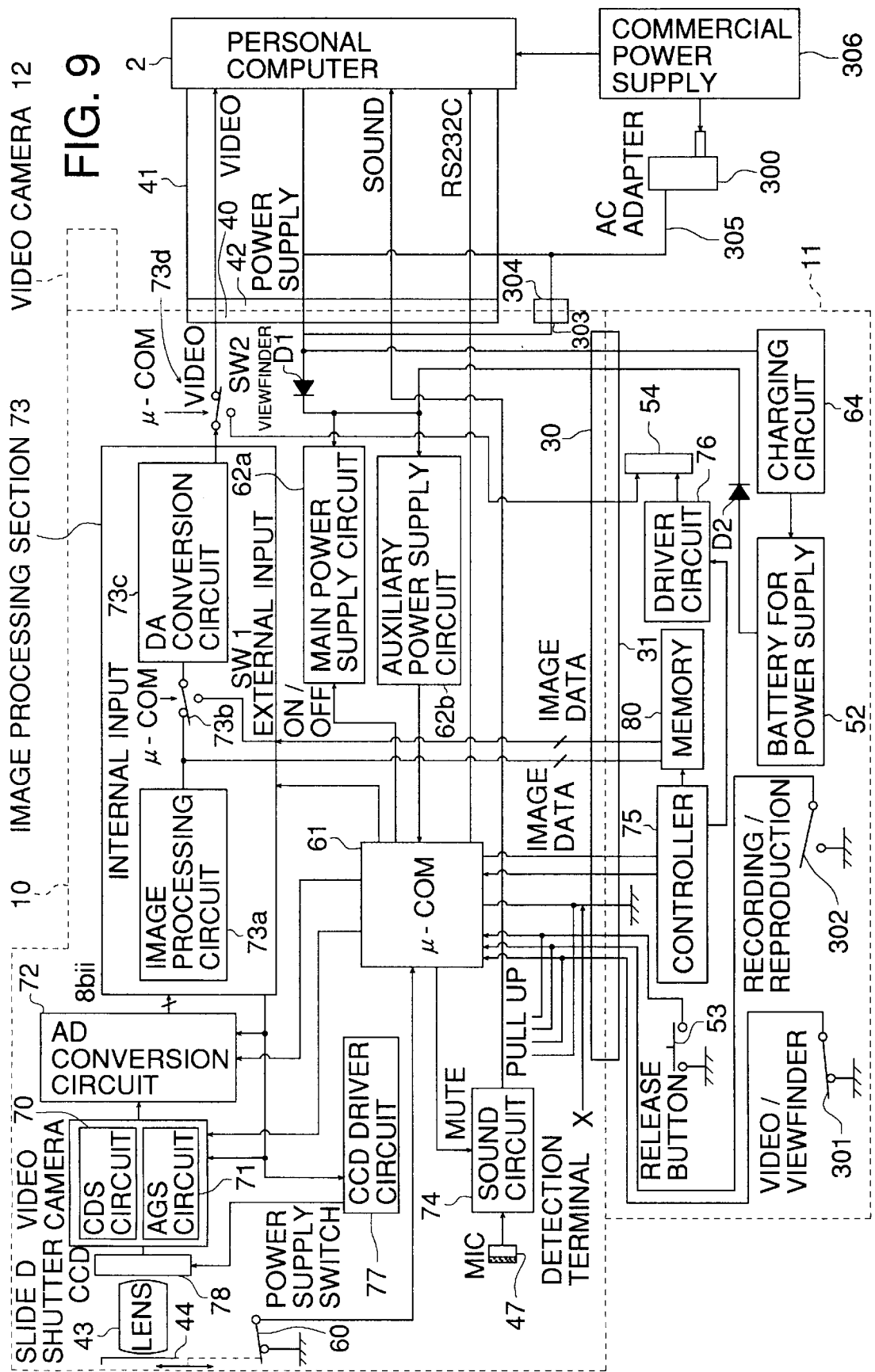
FIG. 9 is a block diagram showing a schematic structure of a video camera.

FIG. 9 is a block diagram showing schematic structure of a video camera. Video camera 6 is composed of camera main body 10 and memory adapter 11, in which connector 30 on the camera main body 10 and connector 31 of the memory adapter 11 are engaged with each other so that the camera main body 10 and the memory adapter 11 are connected through electrical connectors.

Further, to the electrical connector 303 of the camera main body 10, there is connected electrical connector 304 which is connected to commercial power supply 306 through power cord 305 and AC adapter 300. The camera main body 10 can be mounted on and dismounted from camera stand 12.

Power switch 60 is turned ON and OFF being interlocked with lens barrier 44 of the camera main body 10. When power switch 60 is turned ON, microcomputer 61 turns main power circuit 62a ON to output video signals to personal computer 2. When the power switch 60 is turned OFF, microcomputer 61 turns main power circuit 62a OFF to select a standby mode wherein only the microcomputer 61 is supplied with power from auxiliary power circuit 62b to be operated. The main power circuit 62a and the auxiliary power circuit 62b are connected to commercial power supply through diode D1, and are further connected to battery for power supply 52 for the memory adapter 11 through diode D2. The battery for power supply 52 is connected to commercial power supply through charging circuit 64 that constitutes a battery charger. The battery for power supply 52 is constantly charged electrically as long as power cord 305 is connected thereto, and it supplies power when the power cord 305 is removed therefrom.

Personal computer 2 is connected to microcomputer 61, and functions of a camera such as brightness, a tone of color and speed of an electronic shutter are controlled by the use of serial communication RS232C.

Microcomputer 61 controls CDS circuit 70 of camera main body 10, AGC circuit 71, AD conversion circuit 72, image processing section 73 and sound circuit 74 as well as controller 75 of memory adapter 11.

The image processing section 73 controls CDS circuit 70, AGC circuit 71, AD conversion circuit 72 and CCD driver circuit 77, and the CCD driver circuit 77 operates CCD78 to photograph a subject through camera lens 43. The CDS circuit 70 reduces reset noise, output which is substantially the fixed value is obtained through AGC circuit 71, and analog information is converted into digital information by AD conversion circuit 72 to be sent to image processing section 73. The image processing section 73 is provided with image processing circuit 73a, switching circuit 73b and DA conversion circuit 73c. Images are processed by the image processing circuit 73a. The switching circuit 73b is controlled by control command from microcomputer 61 to switch between internal input and external input. The DA conversion circuit 73c converts digital information into analog information, and outputs video signals to personal computer 2.

When the switching circuit 73b is connected to the external input side, a still picture recorded in memory 80 of memory adapter 11 is sent to the DA conversion circuit 73c to be outputted as video signals.

To the output side of the DA conversion circuit 73c, there is connected switching circuit 73d which is controlled by control command from the microcomputer 61 to switch between video output side and viewfinder output side.

When mode changeover switch 301 for video/viewfinder of the memory adapter 11 is set to a viewfinder mode and changeover switch 302 for recording/reproduction mode is set to recording, the microcomputer 61 changes switch SW2 of the switching circuit 73d, and stops video output from camera main body 10 and displays animated images on viewfinder 54 driven by driver circuit 76. When release button 53 is pressed, the microcomputer 61 makes controller 75 to record the animated image on memory 80 as a still picture. For the memory 80, semiconductor memory such as SRAM or DRAM is usually used, and the controller 75 controls data reading, writing in and address for memory 80.

Next, changeover switch 302 for recording/reproduction mode of memory adapter 11 is operated to select the reproduction. The microcomputer 61 changes SW1 of switching circuit 73b to select the external input and outputs the recorded still picture on viewfinder 54. When changeover switch 301 for video/viewfinder mode is operated to select the video mode, the still picture is outputted as video signals.

When mode changeover switch 301 for video/viewfinder of the memory adapter 11 is set to a video mode and changeover switch 302 for recording/reproduction mode is set to the recording, microcomputer 61 selects SW1 of switching circuit 73b to the side of image processing circuit 73a and changes switch SW2 to select the video signal output so that the animated image mode is selected. When release button 53 is pressed in this case, the microcomputer 61 records the image at that time in memory 80 in memory adapter 11 as a still picture, and changes switch SW1 of the switching circuit 73b to select the external input. Thereby, video signals represent the still picture mentioned above, namely the video signals are in the state of freeze. Simultaneously with this, the controller 75 gives an instruction to microcomputer 61 in camera main body 10 to mute a sound. Thus, the sound is muted.

Further, under the state mentioned above, when lens barrier 44 is closed before releasing the release button 53, video signal output is kept to be in the state of freeze, and a sound is kept to be in the mute mode. This mode is used in the TV conference system when a conversing person wants to be neither seen nor heard. The freeze mode and mute mode are canceled when lens barrier 44 is turned ON again. When the lens barrier 44 is turned ON, microcomputer 61 cancels the mute mode for a sound and selects an animated image mode.

Figure 10:
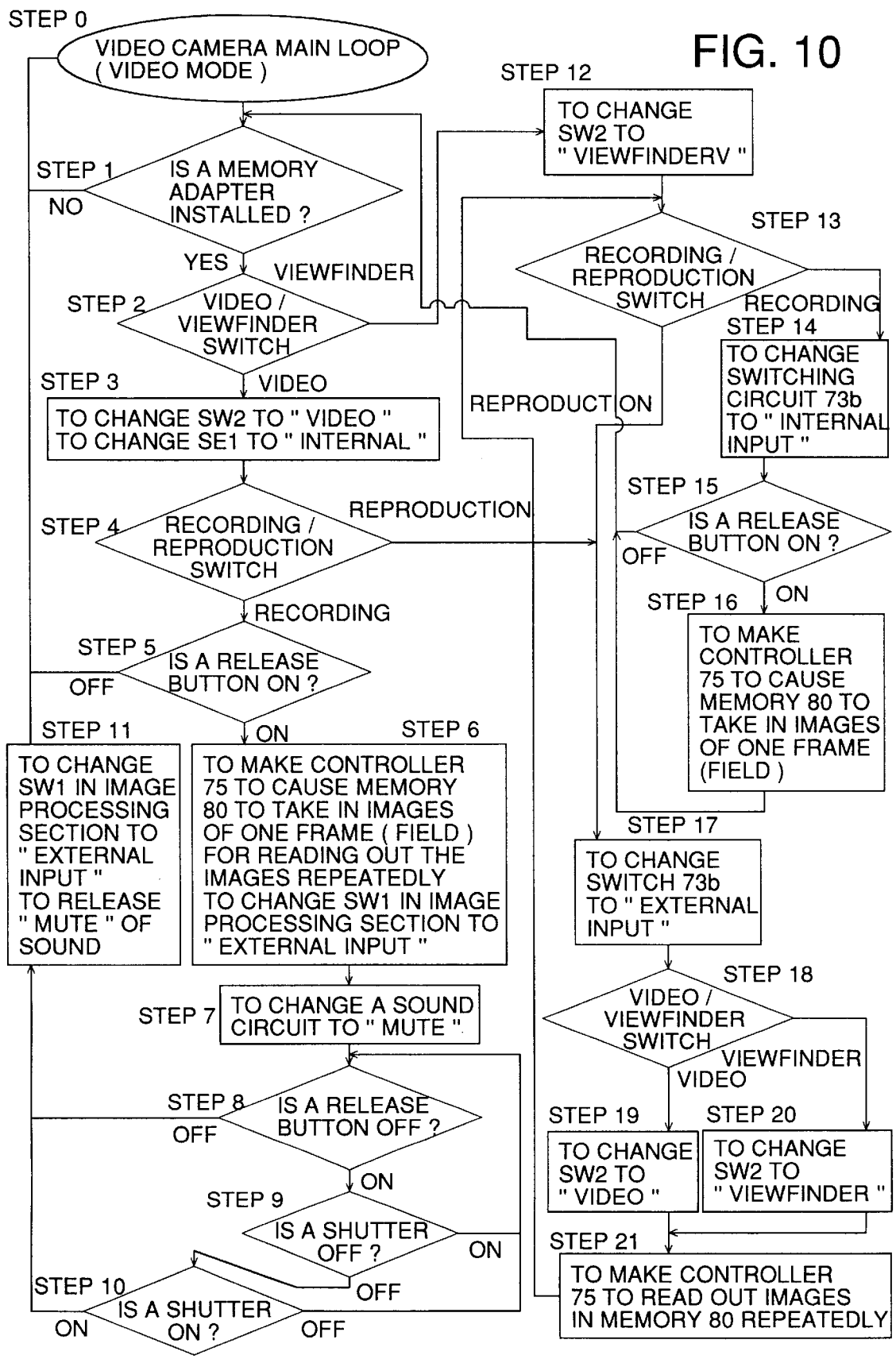
FIG. 10 is a flow chart of operations of a video camera.

A series of operations mentioned above will be explained as follows, referring to a flow chart in FIG. 10. Microcomputer 61 of video camera 6 is performing operations in an ordinary video camera main loop in step 0. The microcomputer 61 is provided with detection terminal X of memory adapter 11, which is pulled up. When the memory adapter 11 is mounted, this detection terminal X is made to be low so that it is possible to confirm whether the memory adapter 11 has been mounted or not, which correspond to step 1. When the memory adapter 11 has been mounted, the state of changeover switch 301 for video/viewfinder mode is checked (step 2). In the case of the video, switch SW2 is changed to the video and switching circuit 73b is changed to the internal input (step 3).

Next, changeover switch 302 for recording/reproduction mode is checked (step 4), and in the case of the recording selected, when release button 53 is pressed (step 5), controller 75 is made to cause memory 80 to take in images on one frame (field) for reading out the images repeatedly. Then, switch SW1 of switching circuit 73b in image processing section 73 is changed to the external input (step 6), then outputted images are frozen and sound circuit 74 is switched to the mute (step 7). When release button 53 is turned ON (step 8), and the shutter is judged to be ON and is turned ON (steps 9 and 10), the SW1 of switching circuit 73b in image processing section 73 is changed to the external input, the mute for a sound is canceled (step 11), and a sequence returns to operations of video camera main loop in step 0. Even when release button 53 is turned OFF in step 8, the sequence moves to step 11.

Next, there will be explained as follows the operations for taking arbitrary images in memory 80 as a still picture in the case of a viewfinder mode. In step 2, when changeover switch 301 for video/viewfinder mode is set to the viewfinder, switch SW2 is changed to viewfinder 54 and images are displayed on viewfinder 54 (step 12). When recording after observing changeover switch 302 for recording/reproduction mode in step 13, switch SW1 of switching circuit 73b is changed to the internal input (step 14). When release button 53 is pressed (step 15), images at that moment are caused to be written in memory 80 as a still picture (step 16), and a sequence returns to step 1.

In the case of the reproduction in step 13, switch SW1 of switching circuit 73b is set to the external input (step 17). When changeover switch 301 for video/viewfinder mode is set to the video (step 18), switch SW2 is changed to the video (step 19), while when the changeover switch is set to the viewfinder, switch SW2 is changed to the finder (step 20), and controller 75 is caused to read out images in memory 80 repeatedly (step 21) and a sequence returns to step 13.

Figure 11:
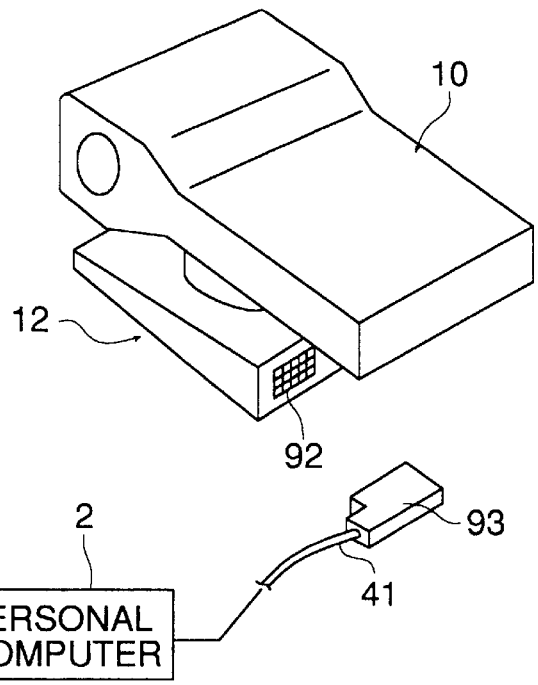
FIGS. 11(a) and 11(b) represent a perspective view showing another example of a video camera.
Figure 11:
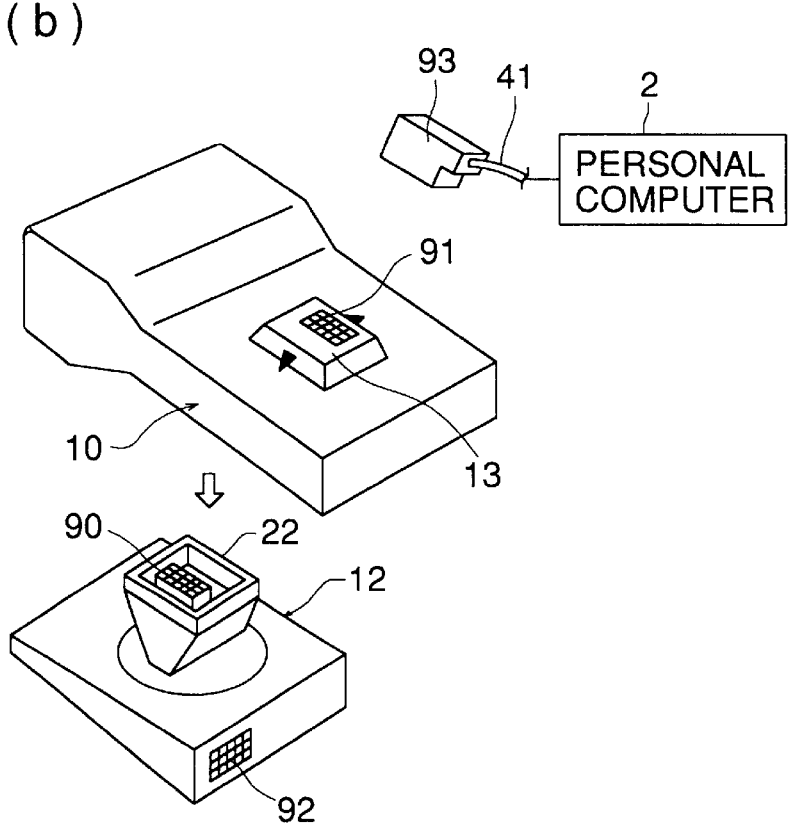
Figure 12:
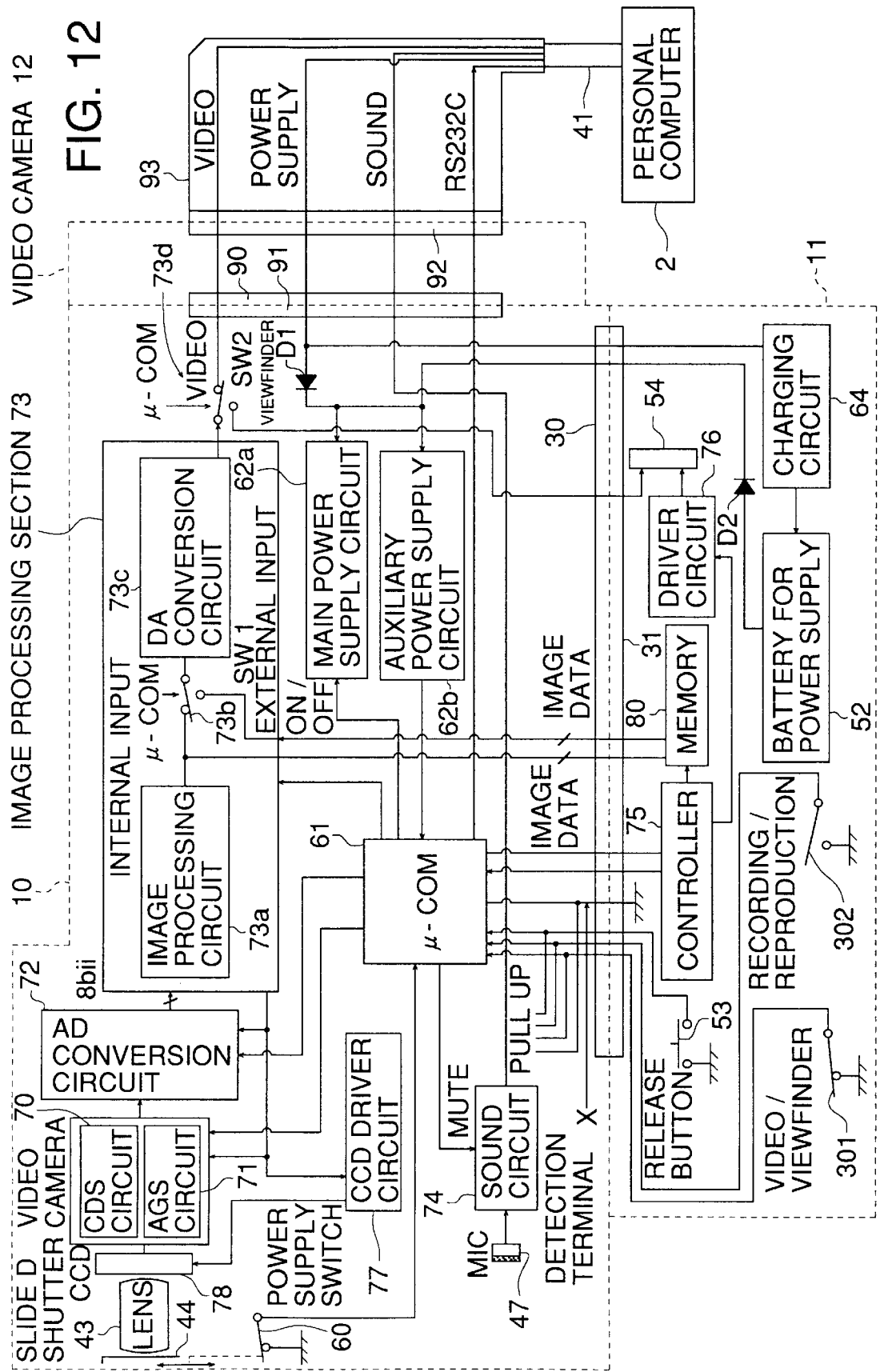
FIG. 12 is a block diagram showing a schematic structure of another example of a video camera.

FIGS. 11 and 12 represent another example of a video camera wherein FIG. 11 is a perspective view of the video camera and FIG. 12 is a block diagram showing the schematic constitution of the video camera.

In the example, connector 91 provided on mounting section 13 on the rear side of camera main body 10 is connected to connector 90 provided on supporting section 22 of camera stand 12, and the camera main body 10 can be mounted on and dismounted from the camera stand 12 through an electrical connector. As stated above, the camera main body 10 can easily be mounted on and dismounted from the camera stand 12 through an electrical connector, thereby the camera main body 10, for example, can easily be dismounted from the camera stand 12 to be used after being connected to memory adapter 11.

Further, cable 41 can be attached to and detached from the camera stand 12 through electrical connector 93 provided on the cable 41 for personal computer 2, the connector 93 being connected to connector 92 provided on the rear side of the camera stand 12.

As indicated in FIG. 11 (a), when camera main body 10 is used after being mounted on camera stand 12, it is easy to handle the camera main body 10 because cable 41 is not connected to the camera main body 10. Further, when using the camera main body 10 after removing it from the camera stand 12 as shown in FIG. 11 (b), connector 93 provided on cable 41 is connected to connector 91 on the camera main body 10 for the usage.

As stated above, cable 41 attached to personal computer 2 is connected to the camera stand 12 on which the camera main body 10 is mounted, and thereby, the cable 41 does not get in the way when changing the position of the camera main body 10 for photographing. It is further possible to connect the cable 41 attached to personal computer 2 to the camera main body 10 which is not mounted on the camera stand 12, by switching an electrical connector, which makes it easy to handle and makes it possible to photograph at an arbitrary position.

Figure 13:
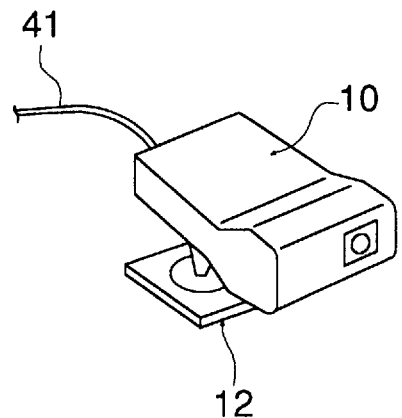
FIG. 13 is a perspective view showing how a video camera is used.
Figure 14:
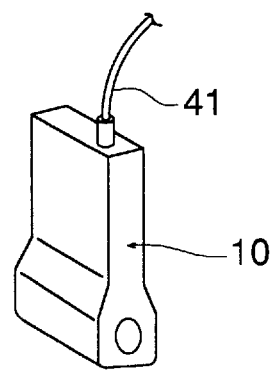
FIG. 14 is a perspective view showing how a video camera is used.
Figure 15:
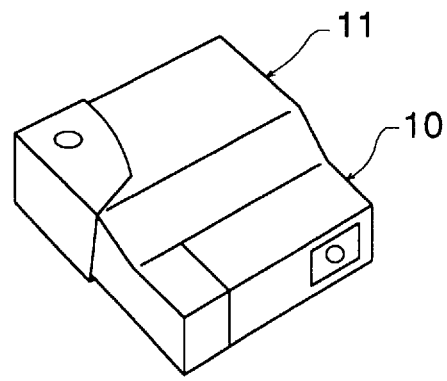
FIG. 15 is a perspective view showing how a video camera is used.
Figure 16:
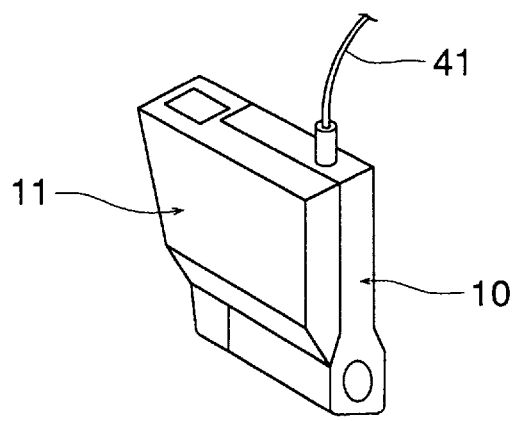
FIG. 16 is a perspective view showing how a video camera is used.
Figure 17:
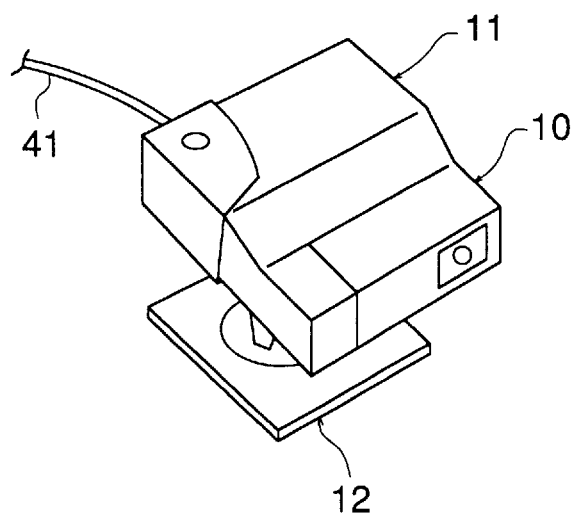
FIG. 17 is a perspective view showing how a video camera is used.

FIGS. 13–17 show how the video camera is used. In FIG. 13, cable 41 is connected to camera main body 10 which is used after being mounted on camera stand 12. In FIG. 14, the camera main body 10 is used after being dismounted from the camera stand 12. In FIG. 15, the camera main body 10 is used after the cable 41 is disconnected from the camera main body 10 and memory adapter 11 is mounted on the camera main body 10. In FIG. 16, the camera main body 10 is used after the cable 41 is connected to the camera main body 10 and memory adapter 11 is mounted on the camera main body 10. In FIG. 17, the camera main body 10 to which the cable 41 is connected and memory adapter 11 is attached is used after being mounted on camera stand 12.

Figure 18:
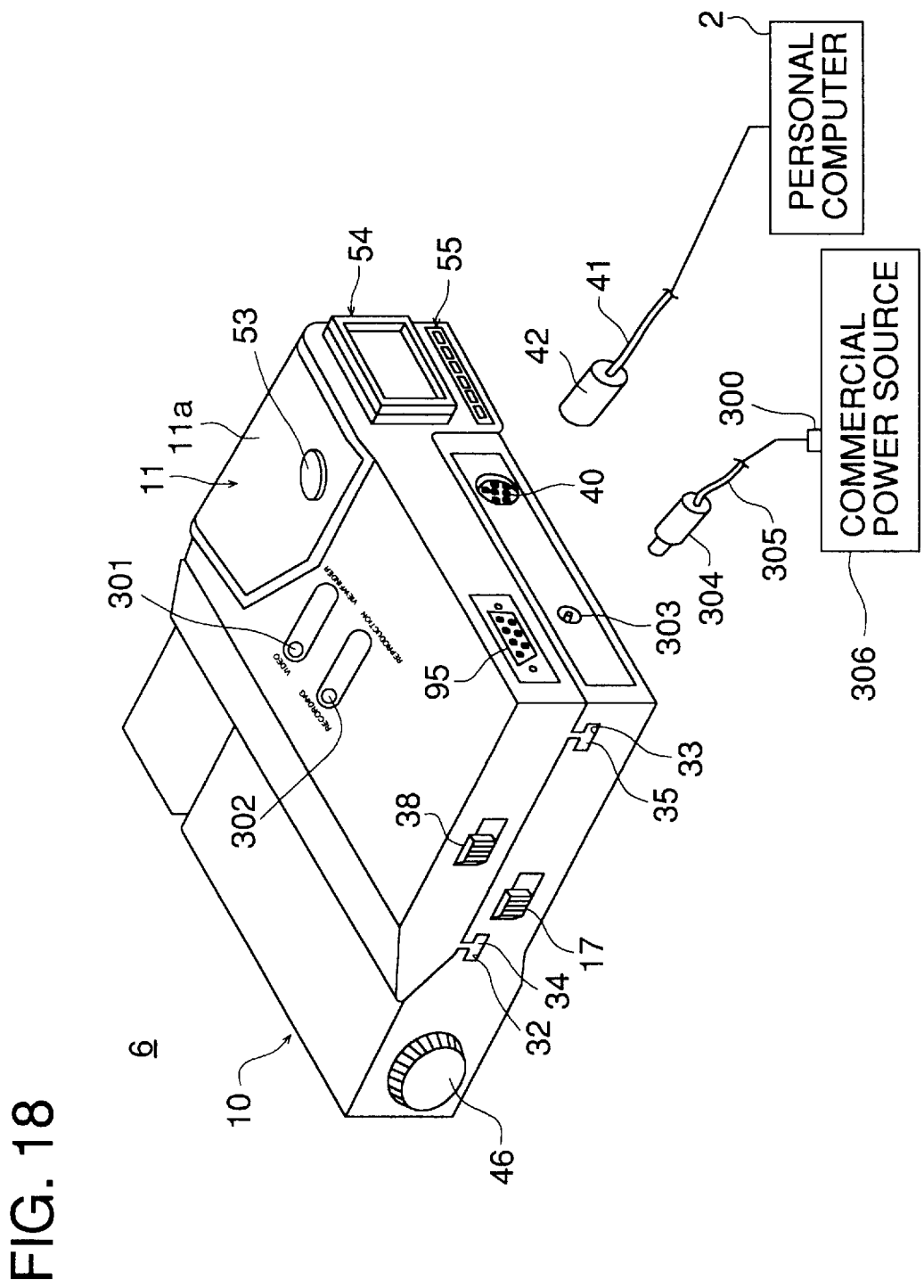
FIG. 18 is a perspective view showing another example of a video camera.
Figure 19:
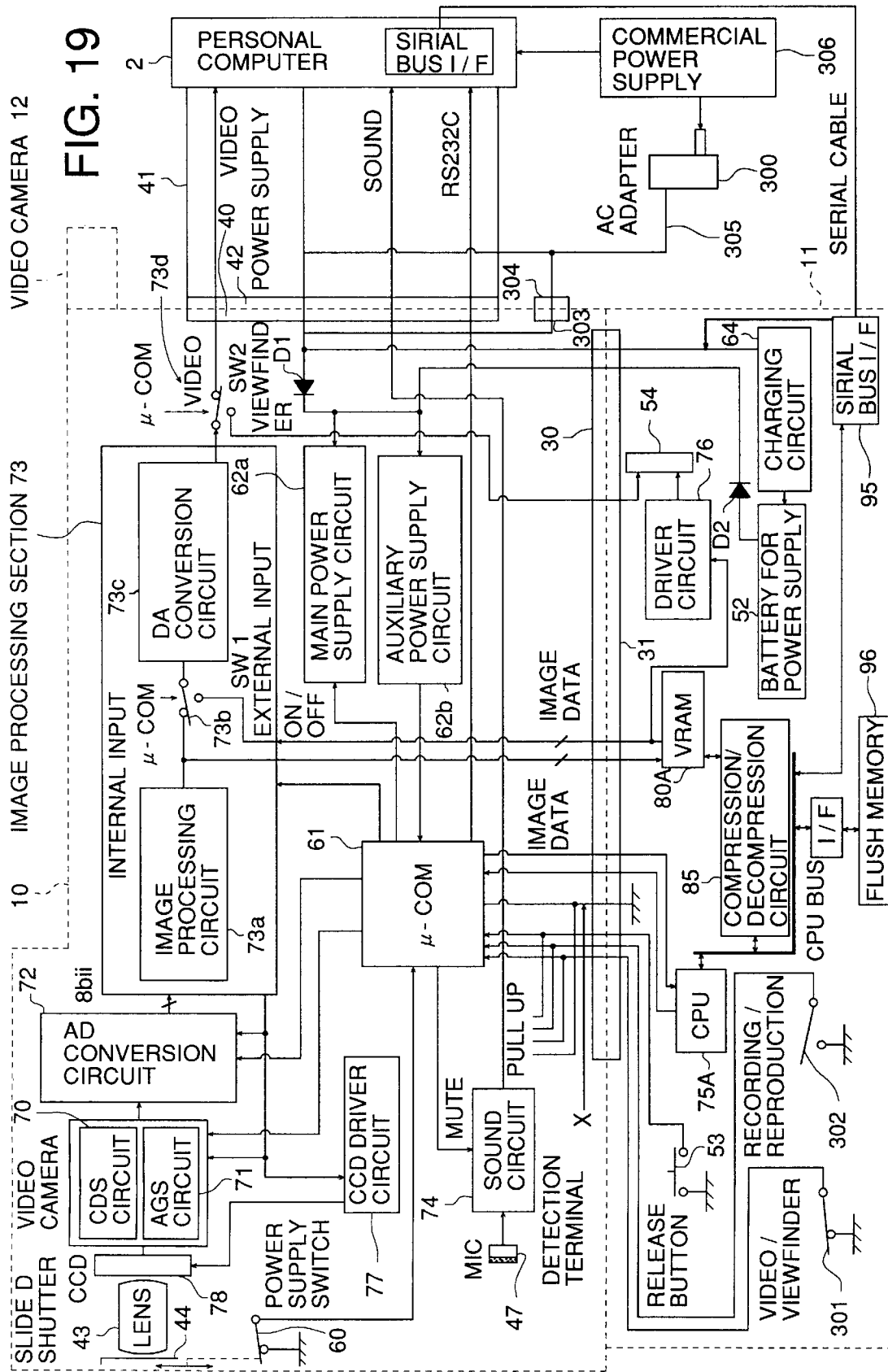
FIG. 19 is a block diagram showing the schematic constitution in another example of the video camera.

FIGS. 18 and 19 represent a system obtained by changing the system in FIG. 9 so that more sheets of still pictures and animated images can be photographed. In the system, it is possible to compress an image to about 100 KB–50 KB, for example, and thereby to record 20–40 sheets of images, if flush memory 96 is of 2 MB, by recording an image corresponding to the moment of pressing a release button on VRAM 80A having a high writing speed and then, by writing on flush memory 96 while compressing image data by compression/decompression circuit 85 through the "JPEG" or "Motion JPEG" system, and yet, no power supply for backup is required. When memory adapter 11 is equipped with serial bus interface 95 based on RS 232C or Apple Talk standard, it is possible to transmit images even to personal computer 2 having no video capture board. Further, when the serial bus interface 95 is changed to a high speed serial interface complying with the standard of Ethernet or Fire Wire, animated images can also be transmitted. In the case of the Fire Wire standard, on this occasion, it is not necessary to prepare power supply on the camera because a personal computer can provide also power supply.

Figure 20:
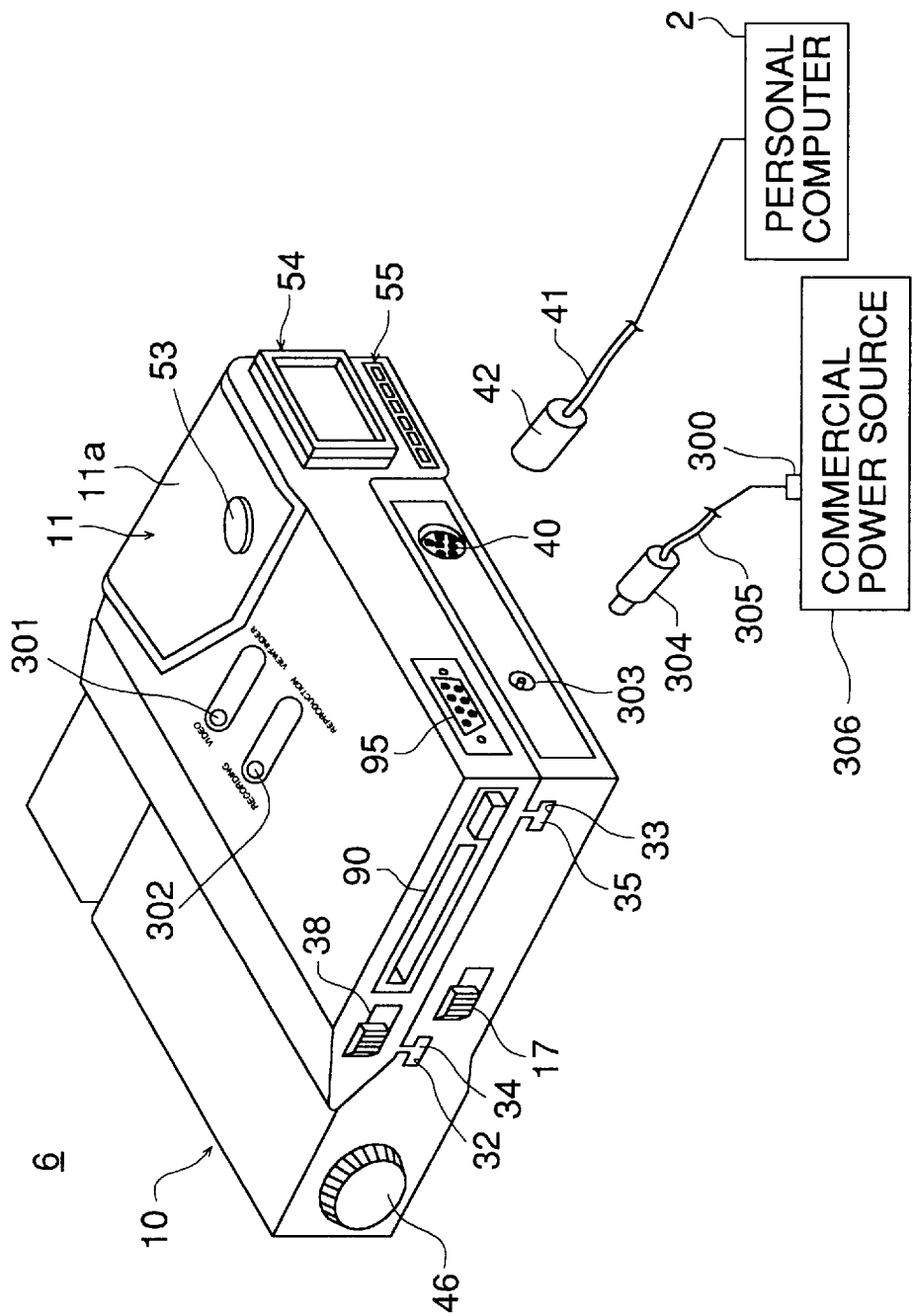
FIG. 20 is a perspective view showing another example of a video camera.

FIGS. 20 and 21 represent an example wherein flush memory 96 housed in memory adapter 11 is replaced with flush memory 97 of PC-CARD in the system of FIGS. 18 and 19. By using this card, the memory can store image data through insertion thereof, independently of the memory capacity. In this system, therefore, it is possible to photograph to get many sheets of still pictures and animated images. In addition, by inserting this card into PC-CARD interface 310 complying with PCMCIA standard, it is possible to view image data on a personal computer.

As stated above, in the invention, it is easy to operate and it is possible to take images in a computer.

Further, a still picture recorded by a memory adapter is sent to a camera main body where outputting to a computer is performed. It is therefore possible to photograph easily even a subject located at an arbitrary position and to take it in a computer.

With regard to a video camera of the invention, since it is constituted so that video signals can be frozen temporarily by a release switch and sound signals can be muted, it is possible to freeze images and mute sounds temporarily through an operation of a release switch when a conversing person wants to be neither seen nor heard.

Further, in the video camera of the invention, a memory adapter is provided with a battery for power supply which can drive a memory adapter and a camera main body when a power cord is removed. Therefore, the video camera can be used on a portable use basis.

Further, in the case of the video camera of the invention, a cord attached to a computer is connected to a camera stand on which a camera main body is mounted. Therefore, even if the camera is used with a cable connected thereto, the cord does not get in the way when the camera position is changed in the case of photographing with the camera main body. It is further possible to connect a cord attached on a computer to the camera main body that is dismounted from the camera stand, by switching an electrical connector, which makes it easy to handle and makes it possible to photograph at an arbitrary position.

Further, in the video camera of the invention, it is possible to transmit video signals and sound signals, which expands a range of application.

Further, in a video camera of the invention, a camera main body can be mounted on and dismounted from a camera stand through an electrical connector. Therefore, it is possible to dismount the camera main body from the camera stand easily, for example, and to use the camera after connecting a memory adapter to the camera main body.

Further, in the video camera of the invention, a memory adapter can be mounted on and dismounted from a camera main body through an electrical connector. It is therefore possible to connect a memory adapter to a camera main body easily when using the memory adapter, and to dismount the memory adapter easily when it is not used.

In the video camera of the invention, a memory adapter is equipped with a viewfinder and/or a focus indicator. It is therefore possible to confirm images for photographing and to photograph easily and clearly to take them in a computer.

What is claimed is:

1. A video camera for photographing animated images, comprising:

a main camera body for outputting analog image signals corresponding to said animated images, said main camera body including
a digital converter for converting said animated images into digital image signals, and
an analog converter for converting said digital image signals to said analog image signals: and a memory adapter, detachable from said main camera body, for recording at least one of said animated images as a still picture, said memory adapter including
memory means for storing said digital image signals,
a controller for controlling said memory means.
a release button for executing a photographing operation.
a battery for supplying electricity to said main camera body and said memory adapter,
a battery charger for charging said battery,
a view finder for viewing said animated images,
a first mode-changing switch for changing modes between a video mode, wherein said main camera body outputs said analog image signals, and a view finder mode, wherein said main camera body outputs image signals for said view finder without outputting said analog image signals, and a second mode-changing switch for changing modes between a recording mode, wherein said controller controls said memory means so as to store said digital image signals corresponding to an image of said animated images as a still picture when said release button is pressed, and a reproduction mode, wherein said still picture stored in said memory means is reproduced, wherein said still picture is stored in said memory means during a first condition when both of said video mode and said recording mode are selected and said release button is pressed, and wherein a second condition is automatically set after said first condition, during said second condition a freeze mode, wherein said still picture stored in said memory means is outputted as said analog image signals being selected, and a mute mode, wherein sound signals from said camera main body are in a state of mute, being selected, said freeze mode and said mute mode being maintained when a lens barrier, provided on said main camera body, is set to a closed position while said release button is pressed.

2. The video camera of claim 1, wherein said battery charger charges said battery when a power cord is connected to one of said main camera body and a camera stand, attached to said main camera body, said battery supplying power to said main camera body and said memory adapter when said power cord is disconnected from both of said main camera body and said camera stand.

3. A video camera for photographing animated images, comprising:

a main camera body for outputting image signals corresponding to said animated images;

a memory adapter. detachable from said main camera body, for recording at least one of said animated images as a still picture, said memory adapter sending image signals, corresponding to said still picture, to said main camera body so that said main camera body outputs said image signals corresponding to said still picture; and a camera stand for supporting said main camera body, said camera stand including a first connector for electrically connecting said camera stand to an outside devices, and a second connector for electrically connecting said camera stand to said main camera body, said main camera body including a third connector for electrically connecting said main camera body to said second connector of said camera stand, said third connector being capable of being directly connected to said outside device via a cable.

4. The video camera of claim 3, wherein said main camera body includes a microphone for transmitting sound signals to said outside device.

5. The video camera of claim 3, wherein said memory adapter includes a connector for electrically connecting said memory adapter to said main camera body, and wherein said memory adapter and said main camera body are electrically connected via said connector when said memory adapter is attached to said main camera body.

6. The video camera of claim 3, wherein said memory adapter includes at least one of a view finder for viewing a photographing image and a focus indicator for indicating focus on an image to be photographed.

7. The video camera of claim 3, wherein said main camera body includes a digital converter for converting said animated images into digital image signals, and an analog converter for converting said digital image signals to said analog image signals, and wherein said memory adapter includes memory means for storing said digital image signals, a controller for controlling said memory means, a release button for executing a photographing operation, a battery for supplying electricity to said main camera body and said memory adapter, a battery charger for charging said battery, a view finder for viewing said animated images, a first mode-changing switch for changing modes between a video mode, wherein said main camera body outputs said analog image signals, and a view finder mode, wherein said main camera body outputs image signals for said view finder without outputting said analog image signals, a second mode-changing switch for changing modes between a recording mode, wherein said controller controls said memory means so as to store said digital image signals corresponding to an image of said animated images as a still picture when said release button is pressed, and a reproduction mode, wherein said still picture stored in said memory means is reproduced, and a connector for electrically connecting said memory adapter to said main camera body, said memory adapter and said camera main body being electrically via said connector when said memory adapter is attached to said main camera body.

8. A video camera for photographing animated images, comprising:

a main camera body for outputting image signals corresponding to said animated main images;

a memory adapter, detachable from said main camera body, for recording at least one of said animated images as a still picture, said memory adapter sending image signals, corresponding to said still picture, to said main camera body so that said main camera body outputs said image signals corresponding to said still picture; and a camera stand, detachable from said main camera body, for supporting said main camera body, said camera stand including a first connector for electrically connecting said camera stand to an outside device, and a second connector for electrically connecting said camera stand to said main camera body, said main camera body and said camera stand being electrically connected via said second connector when said main camera body is attached to said camera stand.

* * * * *

UNITED STATES PATENT AND TRADEMARK OFFICE
CERTIFICATE OF CORRECTION

PATENT NO. : 5,828,986
DATED : October 27, 1998
INVENTOR(S) : Horigome et al.

It is certified that error appears in the above-identified patent and that said Letters Patent is hereby corrected as shown below:

Claim 1, column 12, line 52, "signals:" should read --signals;--.
Claim 1, column 12, line 57, "means." should read --means,--.
Claim 1, column 12, lines 58-59, "operation." should read --operation,--.
Claim 1, column 13, line 19, "signals" should read --signal,--.
Claim 3, column 13, line 38, "adapter." should read --adapter,--.
Claim 3, column 13, line 48, "devices" should read --device--.
Claim 7, column 14, line 38, after "electrically", insert --connected--.
Claim 8, column 14, line 45, after "animated", delete "main".

Signed and Sealed this

Fourteenth Day of December, 1999

Attest:

*Attesting Officer*

Q. TODD DICKINSON

*Acting Commissioner of Patents and Trademarks*